Jan. 27, 1970 A. K. JENSEN 3,492,644
PARALLEL COMPARATOR USING TRANSISTOR LOGIC
Filed March 2, 1966
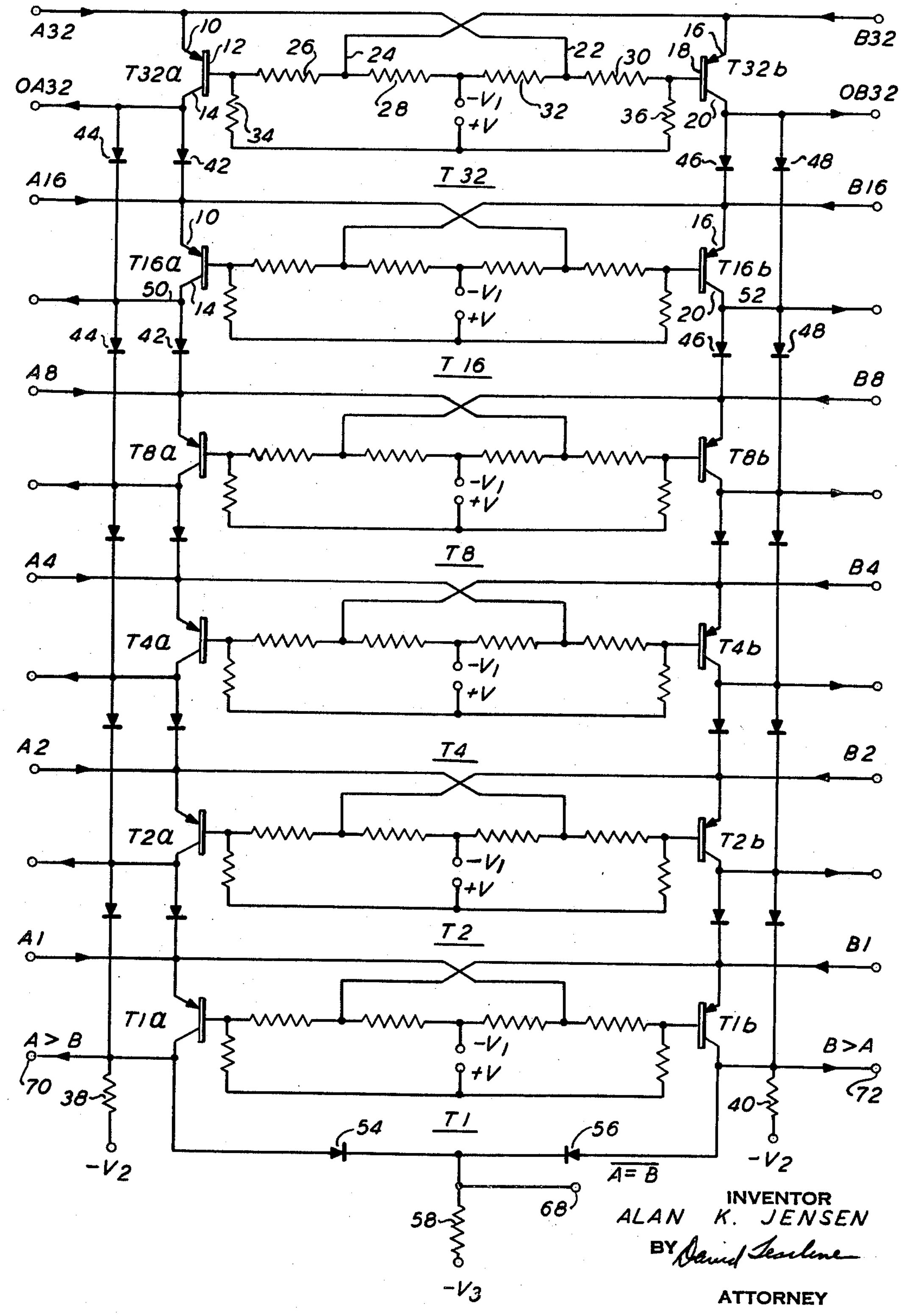
INVENTOR
ALAN K. JENSEN
BY David Tearline
ATTORNEY United States Patent Office 3,492,644

Patented Jan. 27, 1970

3,492,644

PARALLEL COMPARATOR USING TRANSISTOR LOGIC

Alan K. Jensen, Livingston, N.J., assignor to Monroe International Corporation, Orange, N.J., a corporation of Delaware Filed Mar. 2, 1966, Ser. No. 531,179
Int. Cl. G06f 7/02
U.S. Cl. 340—146.2 9 Claims

ABSTRACT OF THE DISCLOSURE

A plurality of non-equality detecting circuits, each comprising a pair of transistors having the emitter of each transistor coupled to the base of the other transistor, each non-equality detecting circuit is serially coupled to another non-equality detecting circuit by diodes, such that when two multi-digit numbers are compared, the appropriate circuit will give a signal indicating a non-equality of the hightest order and prevent the operation of the circuit associated with the lower orders of the number.

This invention pertains to a parallel comparison circuit and more particularly is concerned with a parallel comparison circuit for handling the digits of multiorder numbers and producing output signals indicative of their relative magnitudes as well as an indication of the first and highest order of said multiorder numbers where a disparity exists between the digits of such numbers.

Comparators, as are widely used in the art today, employ generally, the true and complemental values of all numbers which are to be compared by the comparator. This generally necessitates the staticizing of the digits of the numbers to be compared and the formation thereby of both the true and complemental values of the input digits. Such devices make the employment of comparators for on-line use difficult. In most instances digits to be compared must either be stored first in a register and then compared, or the source of such digits must be maintained for a long period of time in order to insure that both the true and complemental values thereof may be formed. Such a technque generally slows down the comparison operation and thus the overall operational speed of the data processing system with which it is employed.

Many of the devices of the prior art employ matrix type systems for comparing the digits of the input multi-order numbers. The presence of noise within the matrix system may lead to the production of erroneous results. In an example wherein two multiorder numbers are to be compared, a first of them having a binary value of 7, that is, 111 being compared with a number such as 5, consisting of 101, the presence of a noise pulse may tend to make the device compare both of the numbers as being equal in value. Further, in other types of devices wherein chain-type comparators are employed, the presence of noise may also give a false pulse indication causing erroneous results to be developed by the comparator.

Briefly stated, the compartor of the present invention is of the chain-type wherein the two numbers to be compared are fed to a set of separate parallel input terminals and a comparison is made starting with the highest order. In this system, only the true value of each digit is necessary and thus the device may be used on an on-line system wherein the true values are normally available. Comparison is started at the highest order of the comparator and as soon as a disparity is found between the input digits of a particular order, the remaining portion of the comparator is blocked so that no further order may produce an output pulse which might in any way distort the comparison found. Also, the digit order at which the first disparity is found will produce an output signal. The final output signal of the chain comparator will also indicate whether the first number is greater than the second, the second is greater than the first, or that both of the impressed numbers are equal.

It is therefore an object of this invention to provide a new and improved comparator.

It is still another object of this invention to provide a new and improved form of parallel comparison circuit employing only the true values of the input numbers.

It is another object of this invention to provide a parallel comparator employing the true values of the impressed numbers and which provides an output signal indicative of the relative size of one number with respect to the other.

It is still another object of this invention to provide a parallel comparator operating with the true values of impressed numbers which provide a signal indicative of the first order of disparity between the impressed numbers.

It is still another object of this invention to provide a parallel comparator operating with the true values of the impressed numbers to be compared and which is relatively immune from the effects of noise.

Other objects and features of the invention will be pointed out in the following description and claims and illustrated in the accompanying drawing, which disclose, by way of example, the principle of the invention, and the best mode which has been contemplated for carrying it out.

The sole figure illustrates the comparator constructed in accordance with the concepts of this invention.

Turning now to the figure, there is shown a comparator for comparing two multiorder numbers in parallel. Although the comparator is as shown arranged to handle six digits of a multi-order number, it should be understood that this is shown for illustrative purposes only and is not intended to limit the device in any manner. It should be understood that the device may be expanded or contracted in accordance with the needs of the particular situation. In order to distinguish the various stages of the device, a number code equivalent to the binary value of the digits impressed upon the comparator is employed, thus for example, stage T32 of the compartor is adapted to handle the bits having a binary value 32 or $2^5$. In a similar fashion, the remaining stages T16, T8, T4, T2 and T1 are arranged to handle the bits having binary values of $16(2^4)$, $8(2^3)$, $4(2^2)$, $2(2^1)$, or $1(2^0)$. In that the operation of each of these stages are identical to one another, only stage T32 will be discussed in detail.

The letters A and B describe the two multi-order numbers to be compared by the device. The designator *a*, as in T32*a*, will indicate that the circuit is arranged to receive a digit of the number A assumed to be impressed upon the terminal A32, whereas the designator *b*, as in T32*b*, indicates that the circuit is arranged to receive a digit of the B number assumed to be impressed upon the terminal B32. Each of the input terminals receiving the digits of the A number are marked with an A followed by the binary value of the digit to be impressed thereon. The input terminals for receiving the digits of the B number are similarly marked.

The transistor T32*a* has an emitter 10, a base 12, and a collector 14, while the transistor T32*b* has an emitter 16, a base 18, and a collector 20. Emitter 10 of transistor T32*a* receives an input signal from the input terminal A32, which is also cross-coupled to the base 18 of the transistor T32*b*, via the line 22. In a similar fashion, the signal impressed on the input terminal B32 is coupled to the emitter 16 of transistor T32*b* as well as cross-coupled by means of the line 24 to the base circuit 12 of the transistor T32*a*. The base 12 of the transistor T32*a* is also connected via a resistor 26 to the point of which the line 24 joins via a further resistor 28, to a terminal point to which a negative voltage $-V_1$ is impressed. In a similar fashion the base of the transistor T32*b* is connected via resistor 30 to the junction point where the line 22 is connected via a further resistor 32 to the same terminal at which the $-V_1$ supply is impressed. The base 12 of the transistor T32*a* prior to the resistor 26 is also coupled by means of a resistor 34 to a terminal to which a positive voltage $+V$ is impressed. The base 18 of the transistor T32*b* prior to the point at which it is connected with the resisor 30, is conneced by means of a resistor 36 to the same terminal to which the positive voltage $+V$ is impressed. The collector 14 of the transistor T32*a* is connected to an output terminal OA32 and in a similar fashion the collector 20 of the transistor T32*b* is connected to an output terminal OB32. The collector 14 of transistor T32*a* is also connected via a diode chain, to be explained in detail below, to a resistor 38, coupled in turn to a negative collector bias source $-V_2$. The collector 20 of transistor T32*b* also is connected through a diode chain to resistor 40, and in turn to a negative collector bias source $-V_2$.

The operation of the circuit shall now be set forth. Assuming for the purpose of illustration that a value of 0 volts is a 1 valued signal and that the value of $-6$ volts is a 0 valued signal, the following example may now be understood. It should be understood, however, that the values of 0 volts and $-6$ volts are arbitrarily chosen in accordance with the circuit parameters and that these may be any other values, depending upon the bias arrangement and the type of transistors employed. It should also be understood that it is not intended in any way to limit the scope of this invention by the type of the transistor used or the bias supplies employed. Assuming a 0 valued signal or $-6$ volts to be impressed upon the input terminals A32 and B32, the signals impressed thereby on the transistors T32*a* and T32*b* will be as follows. The $-6$ volt signal from the terminal A32 will be impressed upon the emitter 10 of the transistor T32*a* and the base circuit 18 of transistor T32*b* via line 22. In a similar fashion the $-6$ volt signal impressed on the terminal B32 will hold the emitter 16 of the transistor T32*b* at $-6$ volts and a $-6$ volt signal will be impressed on the base circuit 12 of the transistor T32*a* via line 24. With $-6$ volts applied to both the base and emitter electrodes of the transistors T32*a* and T32*b*, these transistors will be maintained in the non-conducting or off condition. The output signal which would be read at the terminals OA32 and OB32 connected to the collectors 14 and 20 of transistors T32*a* and T32*b* respectively would be approximately the value of the collector bias supply $-V_2$. In the event that a 1 valued or 0 volt signal was applied to both of the terminals A32 and B32, the transistors T32*a* and T32*b* would each have 0 volts applied to their base circuits and emitter electrodes. The transistors T32*a* and T32*b* would thus also be in a non-conductive or off condition. An output would also be available at the $\overline{A=B}$ terminal 68 providing the lower order stages also have similar signals applied to them. The signal would be approximately the value of the OR gate bias supply $-V_3$. Terminals 68 will provide the bias supply $-V_3$ only when the $A>B$ terminal 70 and the $B>A$ terminal 72 both fail to produce 0 volt output signals. Thus its output is the inverse of the outputs of the terminals 70 and 72.

Assuming now that a 1 valued signal or 0 volts is impressed upon the terminal A32 and a 0 valued signal or $-6$ volts is impressed on the terminal B32. As a result of these input signals there would be a 0 volt signal impressed upon the emitter 10 of the transistor T32*a* while a $-6$ volt signal is impressed on the base circuit 12 of the transistor T32*a* from terminal B32 via line 24. Under these conditions the transistor T32*a* would conduct and produce a signal of 0 volts at its output terminal OA32. As will be described below, the output of transistor T32*a* will also cause an output of 0 volts at the $A>B$ terminal 70 which indicates that the number A is greater than the number B. The output at terminal OA32 will also indicate that the number A is greater than the number B but will also indicate the order of the difference or the highest order in which the digits of the numbers A and B did not agree. The $B>A$ terminal 72 will have a voltage approximately equal to collector bias supply voltage $-V_2$ applied to it.

If the applied input signal pattern to the input terminals A32 and B32 were reversed with respect to those set out above, namely a 0 valued signal, is impressed on terminal A32 and a 1 valued signal impressed on input terminal B32 the outputs at the terminals OA32, OB32, $A>B$ and $B>A$ would be reversed. Output terminals OA32 and $A>B$ terminal 70 would be at approximately the collector bias supply voltage $-V_2$ while output terminals OB32 and $B>A$ terminal 72 would be at 0 volts.

From the foregoing discussion, a truth table which summarizes the output signals for the various input signals can be drawn.

| A32 | B32 | OA32 | OB32 | A>B | B>A | $\overline{A=B}$ |
|---|---|---|---|---|---|---|
| −6V(0) | −6V(0) | $-V_2$ | $-V_2$ | $-V_2$ | $-V_2$ | $-V_3$ |
| OV(1) | −6V(0) | OV | $-V_2$ | OV | $-V_2$ | OV |
| −6V(0) | OV(1) | $-V_2$ | OV | $-V_2$ | OV | OV |
| OV(1) | OV(1) | $-V_2$ | $-V_2$ | $-V_2$ | $-V_2$ | $-V_3$ |

The bias $+V$ together with the voltage divider for the transistor T32*a* formed by the resistors 34 and 26 and the voltage divider for transistor T32*b* formed by the resistors 30 and 36 will insure the transistors T32*a* and T32*b* are properly held in their OFF condition despite small variations on their bases due to leakage and other supply variations and inequalities of levels of all of the impressed signals to the terminals A and B. Further, the divider formed by resistors 28 and 32 together with the source of negative potential $-V_1$ will provide negative current for any demand of negative current by the bases or emitters of the respective transistors T32*a* or T32*b* and will prevent the possible drawing of current from lower order stages and thus causing unwanted turn-on of these transistors.

Turning now to the diode chain connecting the various input and output terminals of the transistors of the respective stages T32 thru T1. The first diode 42 is connected between the collector 14 of the transistor T32*a* of stage T32 and the emitter 10 of the transistor T16*a* of stage T16. A second diode 44 is connected between the collector 14 of the transistor T32*a* of stage T32 and the collector 14 of the transistor T16*a* of stage T16. In a similar fashion the collector 20 of the transistor T32*b* of stage T32 is coupled by a diode 46 to the emitter 16 of the transistor T16*b* of stage T16 and a diode 48 is coupled from the collector 20 of the transistor T32*b* of stage T32 to the collector 20 of the transistor T16*b* of stage T16. The purpose of these diodes is to insure that upon the occurrence of a disparity between the inputs to a higher order stage output signal will be produced by that stage and impressed up on all lower order transistors of the chain on the side opposite to the output side to prevent their operation regardless of their input signals. For example, should a disparity exist in the T32 order of the comparator and output terminal OA32 has a 0 volt or 1 signal applied to it, this 0 volt signal will be applied to the bases of the *b* side of the stages T16 to T1. Thus the *b* side of the comparator cannot produce any output other than $-V_2$. This insures that the signals which are produced at the output will show the order in which the disparity occurred as well as which of the particular input numbers is the larger.

The diode 42 will insure that the output of the transistor T32*a* on the collector 14 is impressed upon the emitter 10 of transistor T16*a* of stage T16. The diode 44 will provide an alternate path for the output of the collector 14 of the transistor T32*a* to insure that whether or not the transistor T16*a* is ON or OFF the output signal will be conducted to the emitter of the following comparator stage, namely transistor T8*a*. Thus there is a coupling between the anodes of the diodes 44 and 42 of stage T16 at the point 50 and a coupling between the anodes of the diodes 46 and 48 of stage T16 at the point 52.

The operation of the diode chain will now be set forth assuming that the signal received at terminal A32 is a binary 1 or 0 volt and the signal at terminal B32 is a binary 0 or −6 volts. Under these conditions the transistor T32*a* would conduct and will produce a 0 volt signal at its collector 14 which is applied to the anodes of the diode 42 and 44 of stage T32. The transistor T32*b* would be held off and would produce a signal at the bias level of $-V_2$ at the anodes of both of its diodes 46 and 48. The output of the diode 42 would cause a signal of 0 volts to be impressed at the input to the base circuit of the transistor T16*b* to insure that the transistor could not be turned ON. In the event that the transistor T16*a* would be turned ON then a 0 volt signal would be available at its collector output 14 and this signal would be conducted by a similar set of diodes 44 and 42 to impress a 0 value signal on the base of transistor T8*b* of the following stage T8V. In the event that the transistor T16*a* is ON there is no need for the additional diode 44 since a 0 signal on its emitter 10 would insure a 0 output signal on its collector 14. In the event, however, that the transistor T16*a* is held OFF then it would be impossible for the 0 value signal at its emitter 10 to be impressed on collector 14 and thus insure that the opposite side or the *b* side was held OFF. Thus, the diode 44 provides a parallel path to insure that the base of the following stage, that is T8*a*, will have a 0 impressed upon it to insure that the transistor T8*b* is held OFF. All the remaining B stages below the stage where the first discrepancy occurred will be held OFF whereas the A stages below the stage of the discrepancy will not be effected.

The first occurrence, however, of an output signal on the A side will signal the relative values of the numbers A and B. The diode chain consisting of diodes 42 and 44 are coupled to an output terminal A is greater than B indicating that the number impressed on the terminal A is greater than B indicating that the number impressed on the terminal A is greater than that impressed upon the terminal B. In a similar fashion the diode chains 46 and 48 are coupled to a common terminal B greater than A showing that the number impressed on the B terminals is greater than that impressed upon the A terminals. The collectors of the transistors T1*a* and T1*b* are connected via a diode or gate consisting of the diodes 54 and 56 and a resistor 58 coupled to a source of negative potential $-V_3$. The absence of a signal to either of the anodes of the diodes 54 and 56 will permit the production of an output signal on the terminal 68 designated $\overline{A=B}$. Thus, it is possible with this device to detect the condition where A is greater than B, B is greater than A, or A is equal to B, as well as indicating the first occurrence of the disparity and thus giving indication of the relative magnitude of the numbers which are compared.

While there have been shown and described, and pointed out, the fundamental novel features of the invention as applied to the preferred embodiment, it will be understood that various omissions and substitutions and changes in the form and details of the device illustrated, and its operation, may be made by those skilled in the art, without departing from the spirit of the invention.

The embodiments of the invention in which an exclusive property of privileges claimed are defined as follows:

1. An apparatus for comparing two multi-order numbers in parallel comprising:
   - a plurality of non-equality detecting circuits, one non-equality detecting circuit for each order of said numbers to be compared, each non-equality detecting circuit having
     - first and second input terminals for receiving the digits in an order of said numbers to be compared, and
     - first and second output terminals for providing signals indicative of the non-equality of the digits impressed on said first and second input terminals, a first of said output terminals providing a signal only when a first of said digits is greater than a second of said digits and a second of said output terminals providing a signal only when the second of said digits is greater than only when the second of said digits is greater than the first of said digits;
   - first coupling means coupling in series all of said first output terminals and all but the highest order of said first input terminals of said non-equality detecting circuits; and
   - second coupling means coupling in series all of said second output terminals and all but the highest order of said second input terminals of said non-equality detecting circuits; said first and second coupling means in combination preventing certain lower order of said non-equality detecting circuits from indicating the non-equality of lower order of the signals upon the occurrence of a signal on either of said first or second output terminals of a higher order of said non-equality detecting circuit.

2. An apparatus for comparing two multi-order numbers as defined in claim 1, further comprising first signal providing means coupled to said first coupling means for providing a first signal indicative that a first of said two multi-order numbers is greater than the second of said two multi-order numbers and second signal providing means coupled to said second coupling means for providing a second signal indicative that the second of said two multi-order numbers is greater than the first of said two multi-order numbers.

3. An apparatus for comparing two multi-order numbers as defined in claim 2, further comprising third signal providing means coupled to said first and second signal providing means for providing a third signal indicative that said two multi-order numbers are equal.

4. An apparatus for comparing two multi-order numbers as defined in claim 3 further including output means coupled to each of said first and second output terminals for providing fourth signals indicative of the highest order in which the digits of said two multi-order numbers are not equal.

5. An apparatus for comparing two multi-order numbers as defined in claim 4, wherein said non-equality detecting circuits each comprise:
   - first and second transistors, said transistors each having
     - a base electrode,
     - an emitter electrode, and
     - a collector electrode, said first input terminal connected to said emitter electrode of said first transistor and said base electrode of said second transistor, said second input terminal connected to said emitter electrode of said second transistor and said base electrode of said first transistor, said first output terminal connected to said collector electrode of said first transistor and said second output terminal connected to said collector electrode of said second transistor; and
   - bias means coupled to said base electrode of said first and second transistors, whereby input signals representative of unequal values of the digits in an order of said multi-order numbers causes said transistor, whose emitter electrode is associated with said input terminal receiving the greater value digit, to conduct and produce an output signal at its associated output terminal while preventing said operation of said other non-equality detecting circuit, said first and second transistors remaining OFF and producing no output signals when said digits are equal in value.

6. An apparatus for comparing two multi-order numbers as defined in claim 5, wherein said first coupling means comprises a first diode chain connecting all of said collector electrodes of said first transistors and all of said emitter electrodes of said first transistors except that of said non-equality detecting circuits receptive to the highest order digit of said numbers and second coupling means comprising a second diode chain connecting all of said collector electrodes of said second transistors and all of said emitter electrodes of said second transistors except that of said non-equality detecting circuit receptive to the highest order digit of said numbers, said diode chains being effective upon the conduction of either of said first or second transistors of any one of said non-equality detecting circuits to assure an indication of non-equality regardless of the conduction of all of said transistors of all of said non-equality detecting circuits receptive to the lower order digits of said numbers beyond said non-equality detecting circuits having said conducting transistor.

7. An apparatus for comparing two multi-order numbers as defined in claim 6 wherein said first signal providing means provides said first signal when said first diode chain receives an output from one of said first transistors and said second signal providing means provides said second signal when said second diode chain receives an output from one of said second transistors.

8. An apparatus for comparing two multi-order numbers as defined in claim 7, wherein said third signal providing means comprises a logical "or" gate, said gate providing said third signal except in the absence of inputs to either of said diode chains.

9. An apparatus for comparing two multi-order numbers as defined in claim 8, wherein said first and second output means comprises a plurality of output lines, each of said output lines coupled to said collector electrode of one of said transistors of one of said non-equality detector circuits, each of said output lines providing said fourth signal to indicate the highest order in which the digits of said two multi-order numbers are not equal and indicating which multi-digit number is the greater.

References Cited

UNITED STATES PATENTS

| | | | |
|---|---|---|---|
| 3,305,831 | 2/1967 | Nelson | 340—146.2 |
| 3,237,025 | 2/1966 | Clapper | 307—88.5 |
| 3,311,753 | 3/1967 | Nelson | 307—88.5 |
| 3,000,001 | 9/1961 | Brink | 340—146.2 X |

MALCOLM A. MORRISON, Primary Examiner

DAVID H. MALZAHN, Assistant Examiner